(12) United States Patent
Song et al.

(10) Patent No.: US 7,808,580 B2
(45) Date of Patent: Oct. 5, 2010

(54) REFLECTOR MEMBER, BACKLIGHT ASSEMBLY AND DISPLAY APPARATUS HAVING THE SAME

(75) Inventors: Si-Joon Song, Yongin-si (KR); Eun-Chae Jeon, Seoul (KR); Gi-Cherl Kim, Gyeonggi-si (KR); Byung-Choon Yang, Seoul (KR); Young-Keun Lee, Cheonan-si (KR); Eun-Jeong Kang, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 346 days.

(21) Appl. No.: 11/874,496

(22) Filed: Oct. 18, 2007

(65) Prior Publication Data

US 2008/0259240 A1  Oct. 23, 2008

(30) Foreign Application Priority Data

Oct. 19, 2006   (KR) ............... 10-2006-0101960

(51) Int. Cl.
*G02F 1/1335* (2006.01)
*G09F 13/04* (2006.01)

(52) U.S. Cl. .................. 349/69; 349/67; 362/97.1; 362/97.2; 362/97.3

(58) Field of Classification Search ........... 349/67, 349/69; 362/97.1–97.3
See application file for complete search history.

(56) References Cited

U.S. PATENT DOCUMENTS

| | | | | |
|---|---|---|---|---|
| 5,847,783 A | * | 12/1998 | Hiramoto et al. | 349/69 |
| 6,502,968 B1 | * | 1/2003 | Simon | 362/489 |
| 6,857,767 B2 | * | 2/2005 | Matsui et al. | 362/373 |
| 7,108,385 B2 | * | 9/2006 | Huang et al. | 362/631 |
| 7,175,329 B1 | * | 2/2007 | Chou | 362/612 |
| 2006/0114694 A1 | * | 6/2006 | Cho et al. | 362/631 |
| 2006/0262554 A1 | * | 11/2006 | Mok et al. | 362/555 |
| 2007/0019419 A1 | * | 1/2007 | Hafuka et al. | 362/373 |

FOREIGN PATENT DOCUMENTS

| | | |
|---|---|---|
| JP | 05-150254 | 6/1993 |
| KR | 1020010001417 A | 1/2001 |
| KR | 1020050091982 A | 9/2005 |

* cited by examiner

*Primary Examiner*—Michael H Caley
(74) *Attorney, Agent, or Firm*—Cantor Colburn LLP (57) ABSTRACT

In a backlight assembly, a reflector member includes a base sheet reflecting a light and a connecting line disposed on a face of the base sheet and, and transmitting signals. An input pad is disposed at a first end portion of the connecting line and receives the signals, and an output pad is disposed at a second end portion of the connecting line and outputs the signals transmitted through the connecting line.

18 Claims, 7 Drawing Sheets

REFLECTOR MEMBER, BACKLIGHT ASSEMBLY AND DISPLAY APPARATUS HAVING THE SAME

This application claims priority to Korean Patent Application No. 2006-101960, filed on Oct. 19, 2006, and all the benefits accruing therefrom under 35 U.S.C. §119, the contents of which in its entirety are herein incorporated by reference.

BACKGROUND OF THE INVENTION

1. Field of the Invention

The present invention relates to a reflector member, a backlight assembly having the reflector member and a display apparatus having the backlight assembly. More particularly, the present invention relates to a reflector member capable of improving brightness uniformity, a backlight assembly having the reflector member and a display apparatus having the backlight assembly.

2. Description of the Related Art

A liquid crystal display includes a liquid crystal display panel displaying images in response to an image signal and a backlight assembly providing light to the liquid crystal display panel.

The backlight assembly mainly employs a light source emitting a white light, such as a cold cathode fluorescent lamp, a flat fluorescent lamp, etc. However, in order to reduce power consumption and improve color reproducibility, a backlight assembly that adopts red, green and blue light emitting diodes as the light source to realize the white light has been developed. Monochromatic light from the red, green and blue light emitting diodes are matched with color filters of the liquid crystal display panel, so that the color reproducibility is improved.

The light emitting diodes are mounted on plural circuit boards and receive power voltage through the circuit boards. The circuit boards are arranged in a matrix configuration. For instance, assuming that the circuit boards are arranged in eight rows by two columns, the circuit boards arranged in a first column are connected to inverters, respectively, to receive the power voltage, and the circuit boards arranged in a second column receive the power voltage through the circuit boards arranged in the first column. The circuit boards arranged in the first column are electrically connected with the circuit boards arranged in the second column, respectively, using a connector.

The connector is protruded from an upper surface of the circuit board due to a thickness thereof. As a result, the backlight assembly needs additional reflector to cover the connector except a reflector provided on the circuit boards, so that an assemblability of the backlight assembly is deteriorated. Also, in case that the backlight assembly does not employ the additional reflector for the connector, the brightness uniformity of the light and the display quality of the liquid crystal display panel are lowered.

BRIEF SUMMARY OF THE INVENTION

An exemplary embodiment provides a reflector member capable of improving assemblability and brightness uniformity.

An exemplary embodiment provides a backlight assembly having the reflector member.

An exemplary embodiment provides a display apparatus having the backlight assembly.

In an exemplary embodiment, a reflector member includes a base sheet, a connecting line, an input pad, and an output pad.

The base sheet reflects a light. The connecting line is disposed on a first face of the base sheet and transmits signals. The input pad is disposed at a first end portion of the connecting line and receives the signals. The output pad is disposed at a second end portion of the connecting line and outputs the signals transmitted through the connecting line.

In an exemplary embodiment, the reflector member further includes a first pad electrode and a second pad electrode. The first pad electrode is disposed on an upper surface of the input pad, electrically connected with the input pad and outputs the signals provided from an exterior of the connecting line. The second pad electrode is disposed on an upper surface of the output pad, electrically connected to the output pad and outputs the signals provided from the output pad.

In an exemplary embodiment, a backlight assembly includes a light emitting unit and a reflector member.

The light emitting unit includes a plurality of light sources, a first circuit board, a second circuit board, a power output pad and a power input pad. Each of the light sources emits a light. The light sources are mounted on the first circuit board and the second circuit board. The first circuit board and the second circuit board provide a power to the light sources. The power output pad is disposed on the first circuit board and outputs the power. The power input pad is disposed on the second circuit board and receives the power.

The reflector member includes a base sheet and a connecting line. The base sheet reflects the light, and the connecting line transmits the power between the first and second circuit boards. The base sheet is disposed above the first and the second circuit boards. Upper faces of the light sources are disposed higher than an upper face of the base sheet. The connecting line is disposed between the base sheet and the first and second circuit boards, and electrically connected between the power output pad and the power input pad of the light emitting unit.

In an exemplary embodiment, a display apparatus includes a display panel displaying images, a light emitting unit, and a reflector member.

The light emitting unit includes a plurality of light sources each emitting a light, a first circuit board, a second board, a power output pad and a power input pad. The light sources are disposed on the first circuit board and the second circuit board. The first circuit board and the second circuit board provide a power to the light sources. The power output pad is disposed on the first circuit board and outputs the power. The power input pad is disposed on the second circuit board and receives the power.

The reflector member includes a base sheet and a connecting line. The base sheet reflects the light and the connecting line transmits the power between the first and second circuit boards. The base sheet is disposed above the first and the second circuit boards. Upper faces of the light sources are disposed higher than an upper surface of the base sheet. The connecting line is disposed between the base sheet and the first and second circuit boards, and electrically connected between the power output pad and the power input pad.

In an exemplary embodiment, the first and second circuit boards are electrically connected to each other directly through the connecting line. Advantageously, the backlight assembly does not need to have additional connectors that electrically connect the circuit boards and additional reflector members that cover the connectors, thereby improving assemblability and brightness uniformity of the backlight assembly.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Hereinafter, the present invention will be explained in detail with reference to the accompanying drawings. In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" or "lower" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
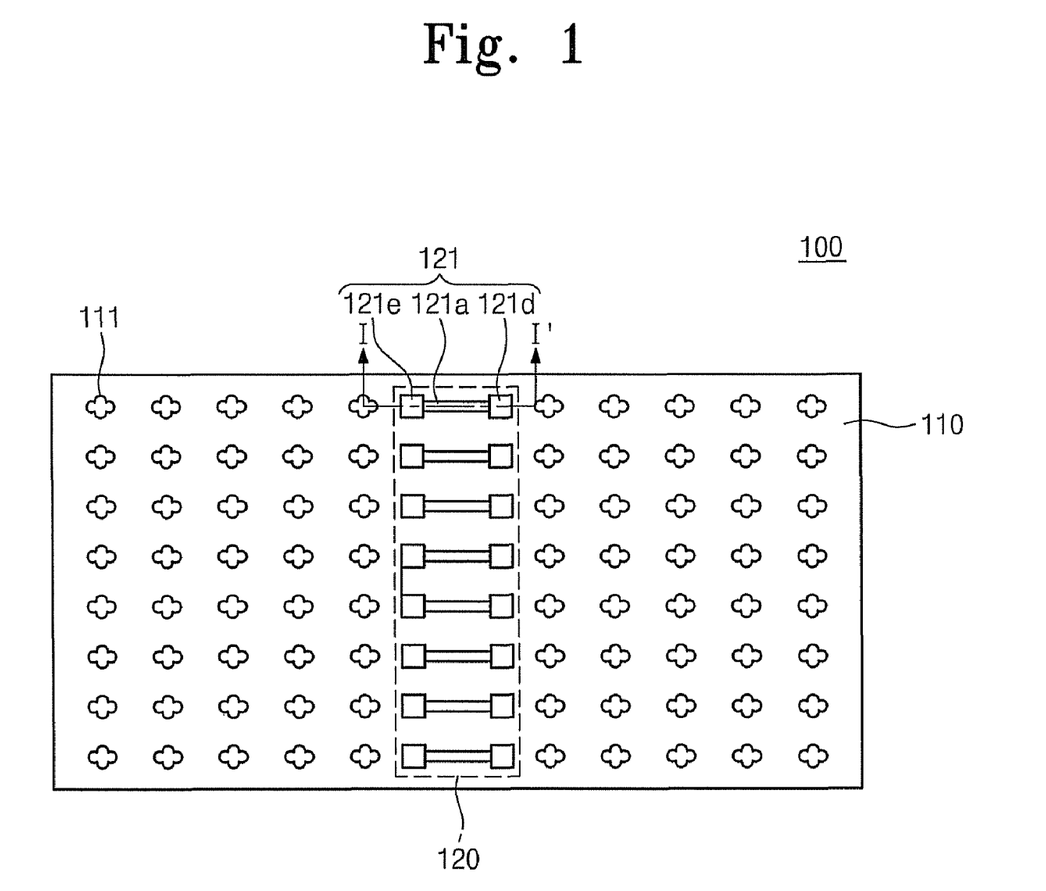
FIG. 1 is a plan view showing an exemplary embodiment of a reflecting plate according to the present invention.
Figure 2:
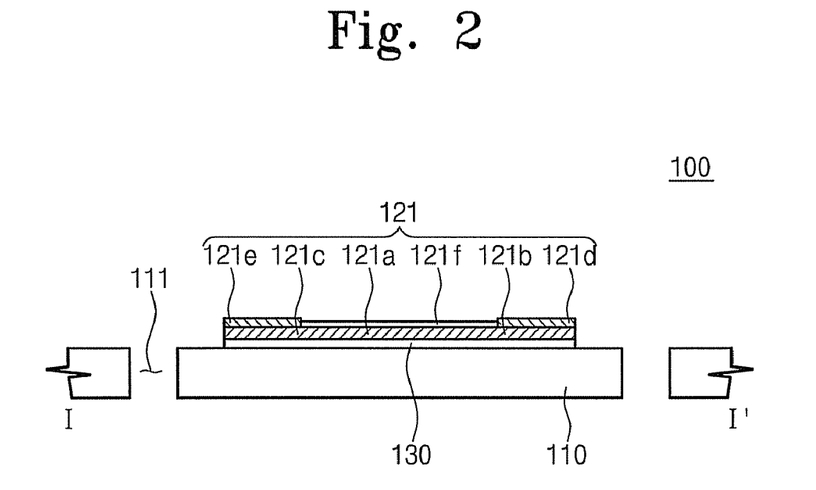
FIG. 2 is a cross-sectional view taken along line I-I' of FIG. 1.
Figure 3:
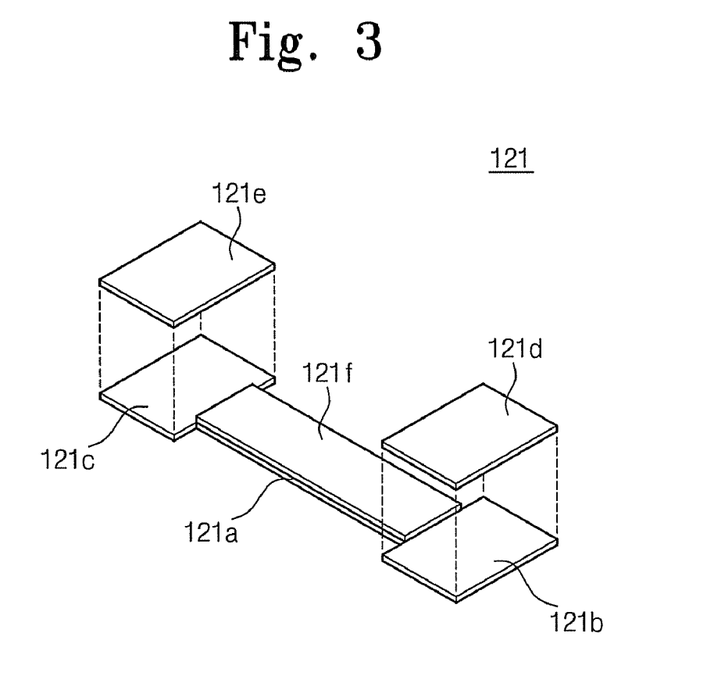
FIG. 3 is an exploded perspective view showing a connecting line of FIG. 1.

FIG. 1 is a plan view illustrating an exemplary embodiment of a reflecting plate according to the present invention, FIG. 2 is a schematic view taken along line I-I' of FIG. 1, and FIG. 3 is an exploded perspective view illustrating a connecting line of FIG. 1.

Referring to FIGS. 1 and 2, a reflecting plate 100 includes a base sheet 110 and a plurality of connecting lines 120.

The base sheet 110 may include a material having a high light reflectance, such as polyethylene terephthalate, polycarbonate or a combination thereof, to reflect a light. In order to insert a light source, the base sheet 110 is provided with a plurality of openings 111 (e.g., insertion holes) formed therethrough. The insertion holes 111 are positioned corresponding to the light sources. As used herein, "corresponding" may be considered as corresponding substantially in shape, dimension and/or positional placement relative to another element.

The connecting line portions 120 are formed on a face of the base sheet 110, such as a rear face, and transmit a signal. The connecting line portions 120 are arranged in a width (e.g., transverse) direction of the base sheet 110. In the illustrated exemplary embodiment, the reflecting plate 100 includes eight connecting line portions 120, but the number of connecting line portions may be increased or decreased according to a number of circuit boards that transmit and receive the signals through the connecting line portions 120.

In the illustrated exemplary embodiment, the connecting line portions have substantially a same structure and function, and thus one connecting line portion 121 will be described in detail as a representative example.

Referring to FIGS. 2 and 3, the connecting line portion 121 includes a connecting line 121a, an input pad 121b, an output pad 121c, a first pad electrode 121d, and a second pad electrode 121e. The connecting line 121a is extended in a longitudinal direction of the base sheet 110, and may include a metallic material, such as aluminum alloy, chromium, etc., to transmit the signals.

The input pad 121b is formed at a first end portion of the connecting line 121a, and the output pad 121c is formed at a second end portion of the connecting line 121a. The input pad 121b is disposed at the first end portion of the connecting line 121a to provide the signal received from an exterior to the connecting line 121a. The output pad 121c is disposed at the second end portion of the connecting line 121a to output the signal received from the connecting line 121a.

The first pad electrode 121d is formed on an upper surface of the input pad 121b and receives the signal to provide the signal to the input pad 121b. The second pad electrode 121e is formed on an upper surface of the output pad 121c and outputs the signal received from the output pad 121c. In the illustrated exemplary embodiment, the first and/or second pad electrodes 121d and 121e may include metal materials having a relatively high conductivity and a relatively low price, such as copper, silver and so on.

Advantageously, the reflecting plate 100 of the illustrated embodiment includes the connecting line portion 121 transmitting the signal, so that the reflecting plate 100 may electrically connect between two different components, as well as reflect the light.

The connecting line portion 121 further includes an insulating layer 121f in order to protect the connecting line 121a. The insulating layer 121f is disposed on an upper surface of the connecting line 121a, such as by coating, and insulates the connecting line 121a and an external conductive component.

The reflecting plate 100 further includes a first adhesive member 130 fixing the connecting line portion 121 to the base sheet 110. The first adhesive member 130 is interposed between the connecting line 120a, the input pad 120b, the output pad 120c, and the base sheet 110 securing the connecting line portion 121 to the base sheet 110.

Hereinafter, a backlight assembly including the reflecting plate 100 will be explained in detail with reference to the accompanying drawings.

Figure 4:
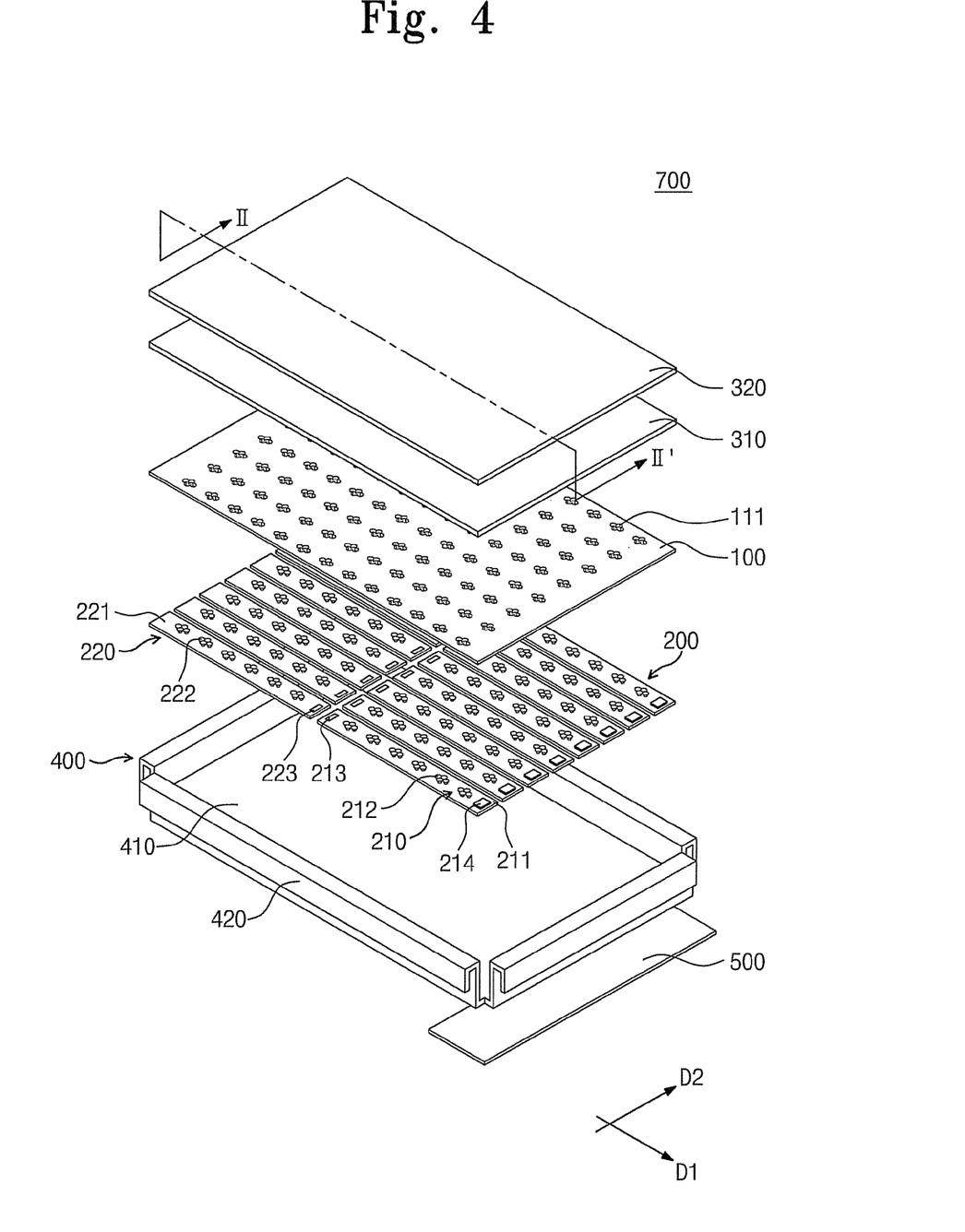
FIG. 4 is an exploded perspective view showing an exemplary embodiment of a backlight assembly according to the present invention.

FIG. 4 is an exploded perspective view illustrating an exemplary embodiment of a backlight assembly according to the present invention.

Referring to FIG. 4, a backlight assembly 700 includes a plurality of light source units 200, the reflecting plate 100, a diffusion plate 310, an optical sheet 320, a bottom chassis 400, and an inverter 500.

The light source units 200 include a plurality of first light source units 210 and a plurality of second light source units 220 emitting a light. The first and second light source units are disposed adjacent to each other in a first direction D1.

The first light source units 210 are arranged in a second direction D2 substantially perpendicular to the first direction D1 and each is electrically connected with the inverter 500. In present exemplary embodiment, the first light source units 210 include eight first light source units 210, but the number of the first light source units 210 may be increased or decreased according to a size of the backlight assembly 700.

Figure 5:
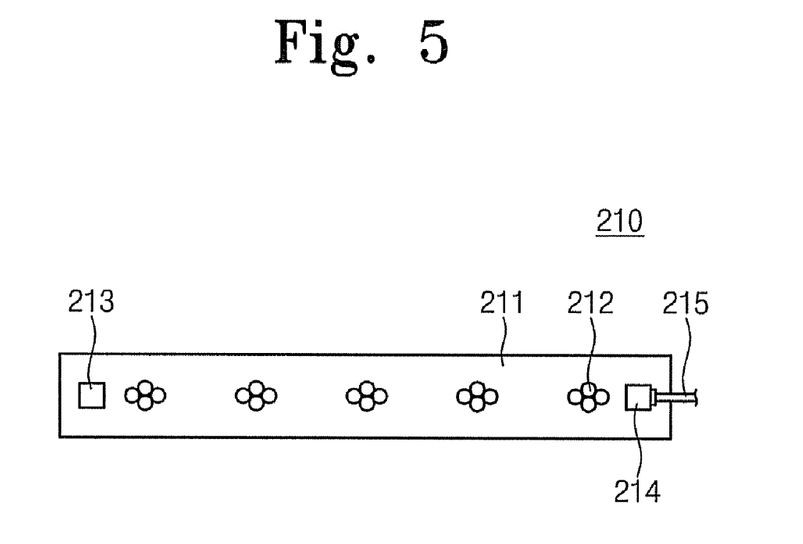
FIG. 5 is a plan view showing a first circuit board of FIG. 4.

FIG. 5 is a plan view illustrating the first light source unit of FIG. 4.

Referring to FIGS. 4 and 5, each of the first light source units 210 includes a first circuit board 211, a plurality of first light source portions 212, and a power output pad 213. The first circuit board 211 is extended in the first direction D1 and electrically connected with the inverter 500 to receive a power from the inverter 500.

The first light source portions 212 are mounted on an upper surface of the first circuit board 211 and emit the light in response to the power applied from the first circuit board 211. The first light source portions 212 are arranged separated from each other along a longitudinal direction of the first circuit board 211, that is, in the first direction D1. Each of the first light source portions 212 may include a plurality of point light sources. In one exemplary embodiment, the point light sources include light emitting diodes ("LED"). In the present exemplary embodiment, the point light sources include a red LED emitting a red light, a green LED emitting a green light, and a blue LED emitting a blue light. The first light source portions 212 emit a white light into which the red, green, and blue lights are mixed.

The power output pad 213 is located at a first end of the first circuit board 211 and adjacent to the second light source units 220. The power output pad 213 is disposed on the upper surface of the first circuit board 211 and outputs the power applied from the inverter 500. In other words, the first circuit board 211 provides the power applied from the inverter 500 to the first light source portions 212 and the power output pad 213, and the power output pad 213 outputs the power received from the inverter 500 through the first circuit board 211.

Each of the first light source units 210 further includes a connector 214 that connects electrically between the inverter 500 and the first circuit board 211. The connector 214 may be mounted on the upper surface of the first circuit board 211, such as disposed at a second end of the first circuit board 211, and is electrically connected with the inverter 500 through a wire 215. The power output pad 213 and the connector 214 are disposed at opposing ends of the first circuit board 211, respectively, while having the first light source portions 212 interposed therebetween.

Figure 6:
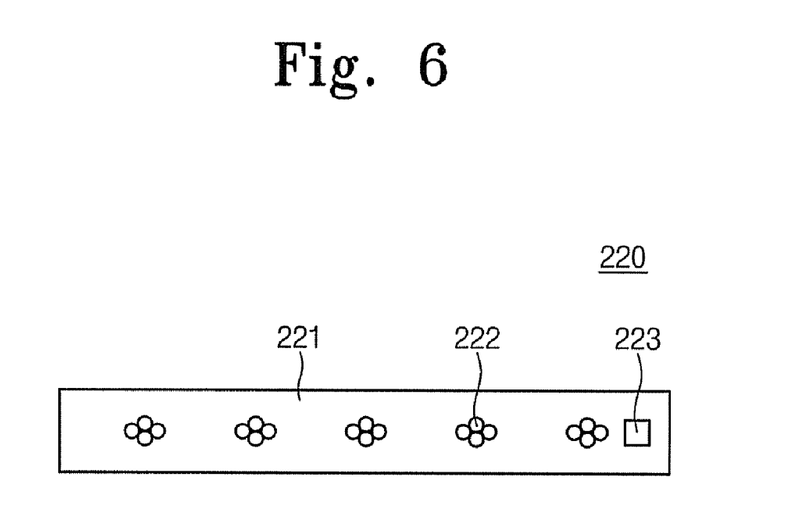
FIG. 6 is a plan view showing a second circuit board of FIG. 4.

FIG. 6 is a plan view illustrating the second light source unit of FIG. 4.

Referring to FIGS. 4 and 6, the second light source units 220 are arranged in the second direction D2 substantially perpendicular to the first direction D1, and are electrically connected the first light source units 210. Here, the number of the second light source units 220 is equal to that of the first light source units 210. However, the present invention is not limited thereto.

Each second light source unit 220 includes a second circuit board 221, a plurality of second light source portions 222, and a power input pad 223. The second circuit board 221 is extended in the first direction D1, and receives the power from an adjacent first circuit board 211.

The second light source portions 222 are mounted on an upper surface of the second circuit board 221 and emit the light in response to the power received through the second circuit board 221. The second light source portions 222 are arranged spaced apart from each other in a longitudinal direction of the second circuit board 221, that is, in the first direction D1. Each second light source portion 222 has the same structure and function as those of the first light source portions 212, and thus detailed descriptions of the second light source portions 222 will be omitted.

The power input pad 223 is disposed at a first end of the second circuit board 221 and adjacent to the first light source unit 210 on the upper surface of the second circuit board 221, and receives the power through the first circuit board 211. The second circuit board 221 provides the power received through the power input pad 223 to the second light source portions 222.

Figure 7:
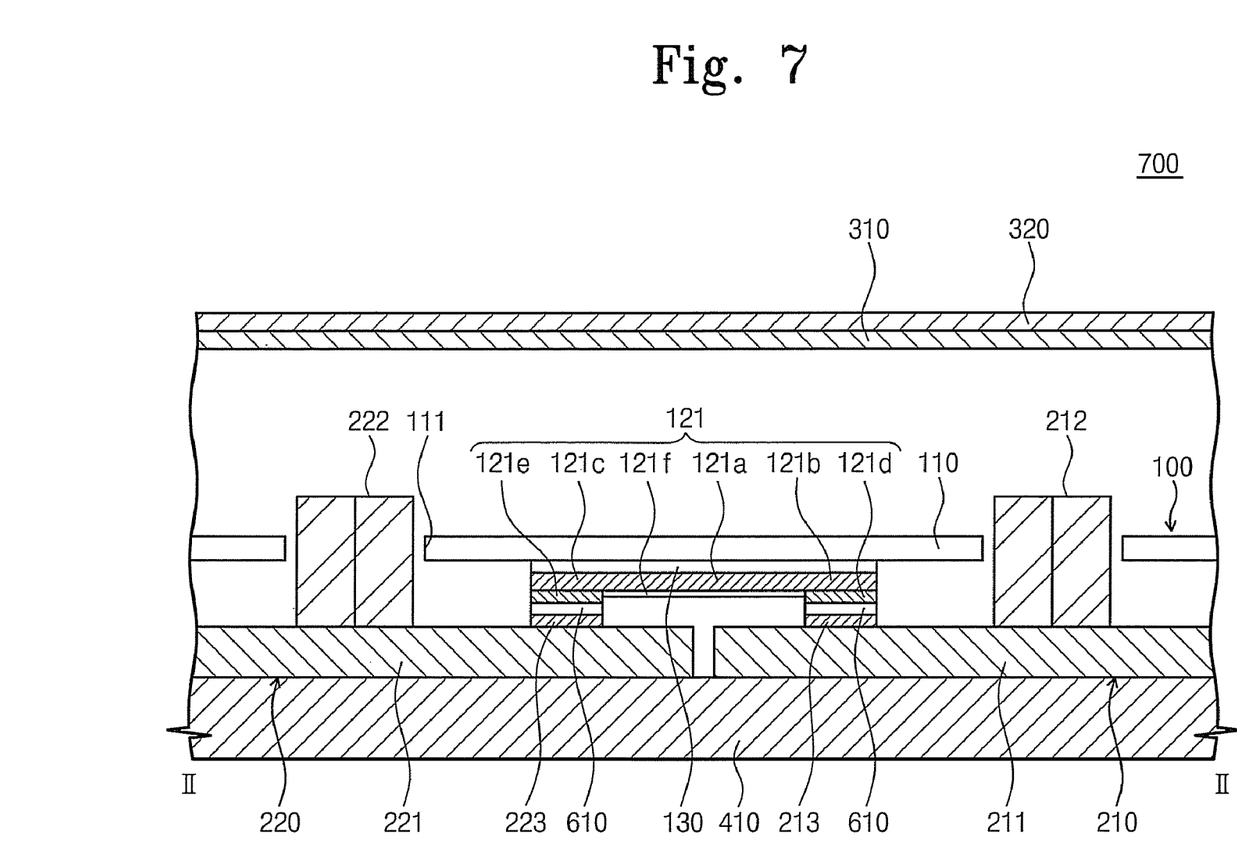
FIG. 7 is a cross-sectional view taken along line II-II' of FIG. 4.

FIG. 7 is a cross-sectional view taken along line II-II' of FIG. 4.

Referring to FIGS. 4 and 7, the diffusion plate 310 and the optical sheet 320 are successively arranged on an upper portion of the light source units 200. The light emitted from light source units 200 is diffused through the diffusion plate 310, and the light from the diffusion plate 310 exits through the optical sheet 320 and improves a brightness characteristic of the light.

The reflecting plate 100 is disposed under the first and second light source portions 212 and 222, such that the upper surface of the reflecting plate 100 is lower than an upper surface of the first and second light source portions 212 and 222. The reflecting plate 100 has substantially the same structure and function with those of the reflecting plate 100 shown in FIGS. 1 to 3, and thus the detailed description of the reflecting plate 100 will be omitted here.

The reflecting plate 100 includes a base sheet 110 and a connecting line portion 120 (refer to FIG. 1). The base sheet 110 reflects the light, and the connecting line portion 120 electrically connects between the first circuit boards 211 and the second circuit boards 221.

In one exemplary embodiment, a rear face of the base sheet 110 of the reflecting plate 100 is disposed on upper surfaces of the first and second circuit boards 211 and 221. The base sheet 110 is provided with insertion holes 111 extended through the base sheet 110, such that the first and second light source portions 212 and 222 may be inserted in a direction from the rear face of the base sheet 110 towards a front (or upper) face of the base sheet 110. The first and second light source portions 212 and 222 pass through the insertion holes 111 such that the first and second light source portions 212 and 222 are disposed on upper sides of the base sheet 110. The first light source portions 212 and the second light source portions 222 protrude above the upper surface reflection sheet 100 as illustrated in FIG. 7.

Each of the connecting line portions 121 is formed under (e.g. on the rear face) the base sheet 110, and is electrically connected to the power output pad 213 of the first light source unit 210 and the power input pad 223 of the second light source unit 220. The connecting line portions 121 of the reflecting sheet 100 face the power output pad 213 of the first light source unit 210 and the power input pad 223 of the second light source unit 220, as illustrated in FIG. 7.

The connecting line portion 121 includes a connecting line 121a, an input pad 121b, an output pad 121c, a first pad electrode 121d, and a second pad electrode 121e. The first pad electrode 121d is disposed corresponding to the power output pad 213 formed on the first circuit board 211, and is electrically connected with the power output pad 213. The first pad electrode 121d outputs the power received from the power output pad 213 of the first light source unit 210 to the input pad 121b, and the input pad 121b provides the power to the output pad 121c through the connecting line 121a.

The output pad 121c outputs the power to the second electrode pad 121e. The second electrode pad 121e is disposed corresponding to the power input pad 223 formed the second circuit board 221, and is electrically connected with the power input pad 223 to output the power to the power input pad 223. The power input pad 223 provides the power to the second circuit board 221, and the second circuit board 221 provides the power to the second light source portions 222.

As in the illustrated embodiment, the backlight assembly 700 connects electrically between the first circuit board 211 and the second circuit board 221 using the connecting line portion 121. Advantageously, to connect the first and second circuit boards 211 and 221 to each other, each of the first and second light source units 210 and 220 does not need to have an additional connector. Additionally, the backlight assembly 700 does not need to have additional reflecting plates covering the connector and covering the first and second circuit 211 and 221. The exemplary embodiments of the backlight assembly as illustrated, may improve assemblability and brightness uniformity, thereby enhancing productivity and display characteristics thereof.

In an exemplary embodiment, the backlight assembly 700 may further include a second adhesive member 610 adhering the reflecting plate 100 to the first and/or second light source units 210 and 220. As illustrated in FIG. 7, the second adhesive member 610 may be interposed between the power output pad 213 of the first light source unit 210 and the first electrode pad 121d of the connecting portion 121, and between the power input pad 223 of the second light source unit 220 and the second electrode pad 121e of the connecting portion 121, thereby adhering the reflecting plate 100 to the first and second circuit boards 211 and 212. In an exemplary embodiment, the second adhesive member 610 may include a conductive adhesive material, such as to electrically connect the connecting line portion 121 and the power output pad 213, and the connecting line portion 121 and the power input pad 223.

Figure 8:
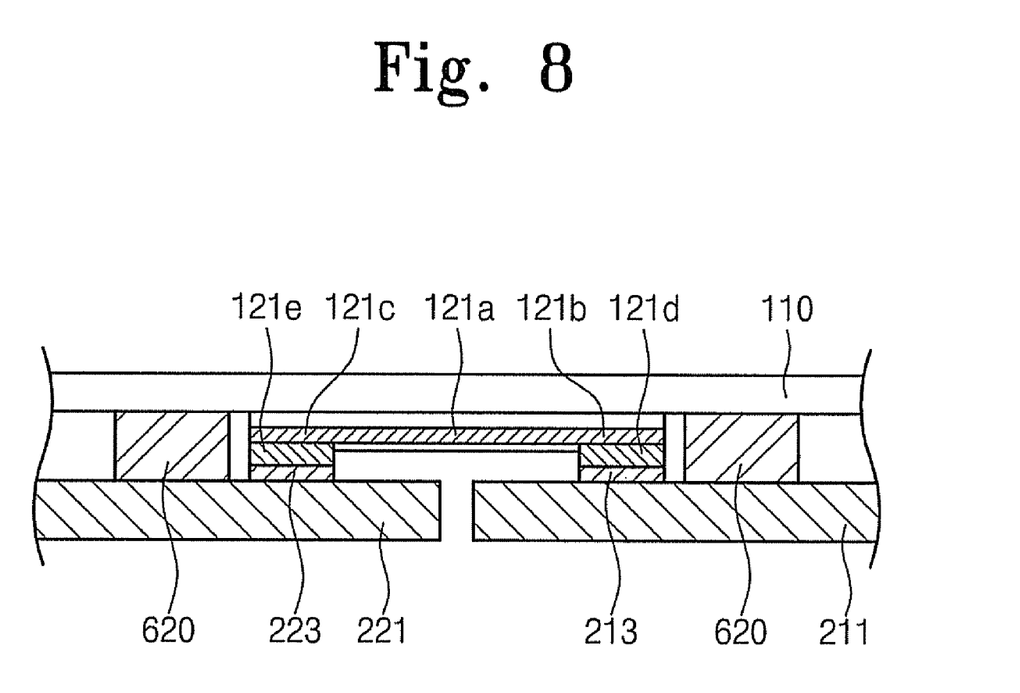
FIG. 8 is a schematic sectional view showing another exemplary embodiment of an adhesive member of FIG. 7.

FIG. 8 is a schematic sectional view showing another exemplary embodiment of an adhesive member of FIG. 7.

Referring to FIG. 8, the reflecting plate 100 is combined with the first and second light source units 210 and 220 using a third adhesive member 620 interposed between the base sheet 110 and the first and second circuit boards 211 and 221. In an exemplary embodiment, the third adhesive member 620 may include an insulating adhesive material configured to adhere the base sheet 110 to the first and second circuit boards 211 and 221, so that the reflecting plate 100 is attached to the first and second circuit boards 211 and 221. The first pad electrode 121d makes direct contact with the power output pad 213 to be electrically connected with the power output pad 213, and the second pad electrode 121e makes directly contact with the power input pad 223 to be electrically connected with the power input pad 121e. The third adhesive 620 directly contacts the base sheet 110 of the reflecting plate 100, and the first circuit board 211 and the second circuit board 221 of the light source units 200.

Referring to FIGS. 1, 4 and 7, the light source units 200 and the reflecting plate 100 are received in the bottom chassis 400. In an exemplary embodiment, the bottom chassis 400 may include a relatively hard metallic material. The bottom chassis 400 includes a bottom surface 410 and a sidewall 420. The light source units 200 and the reflector plate 100 are disposed on the bottom surface 410. The sidewall 420 is extended from the bottom surface 410, such as in an upward direction towards the light source units 200, and defines a receiving space into which the reflecting plate 100 and the light source units 200 are received.

In the illustrated embodiment, such as in FIG. 4, the sidewall 420 of the bottom chassis 400 includes a portion bent in substantially a 'U' shape to provide a space where the sidewall 420 may be coupled to other elements. A first portion of the 'U' shape includes the sidewall 420, a second portion substantially parallel to the bottom surface 410 (e.g., extending horizontally) and a third portion substantially parallel to the sidewall 420.

The inverter 500 is disposed on a rear surface of the bottom chassis 400, e.g., a rear face of the bottom surface 410, and is electrically connected with the first circuit board 211 to provide the power to the first circuit board 211.

Figure 9:
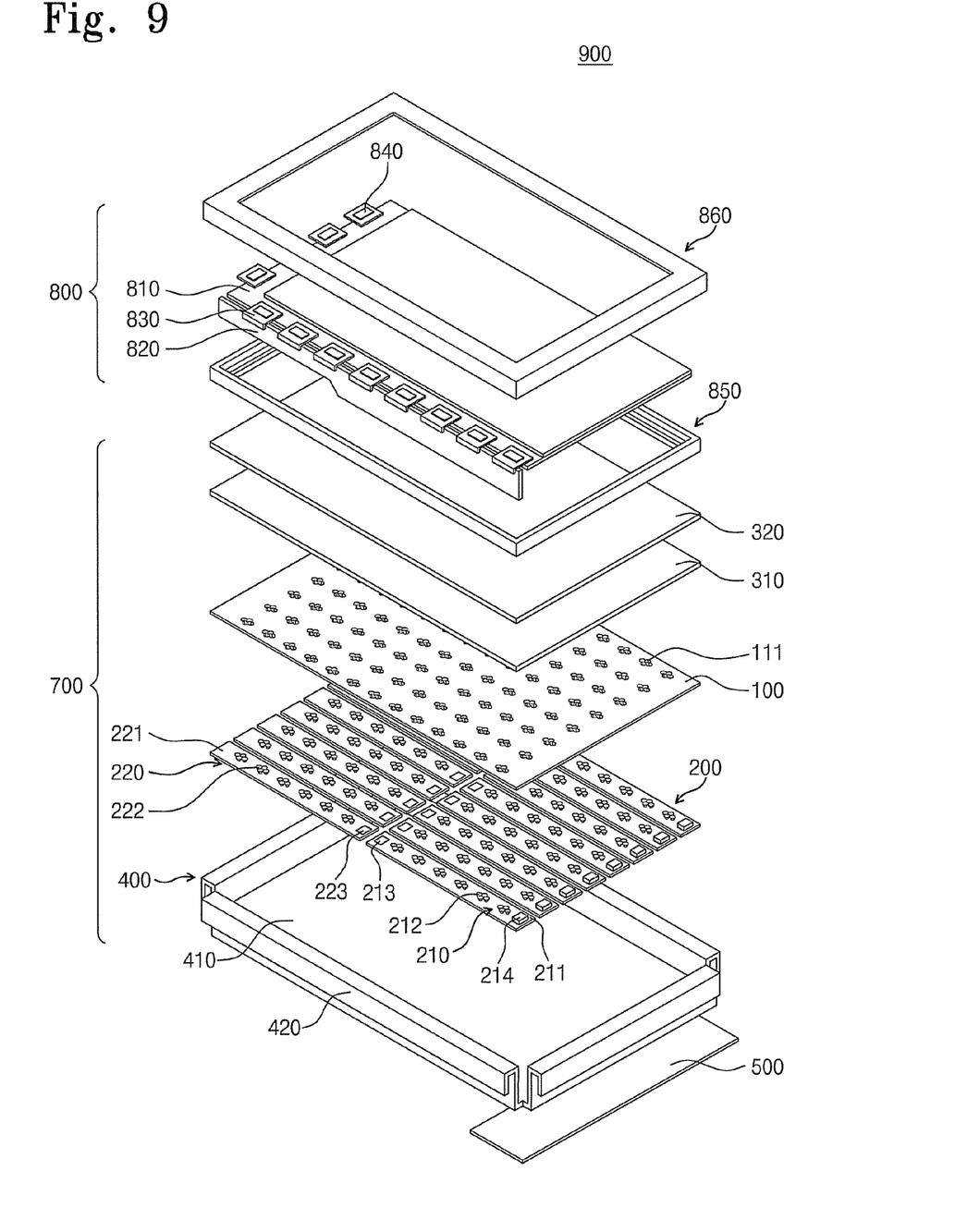
FIG. 9 is an exploded perspective view showing an exemplary embodiment of a liquid crystal display according to the present invention.

FIG. 9 is an exploded perspective view illustrating an exemplary embodiment of a liquid crystal display according to the present invention.

Referring to FIG. 9, a liquid crystal display 900 includes a backlight assembly 700 providing a substantially uniform light and a display panel assembly 800 displaying images, such as by using the light.

In the illustrated exemplary embodiment, the same reference numerals denote the same elements in FIG. 4, and thus detailed descriptions of the same elements will be omitted.

The display panel assembly 800 is disposed on an upper portion of the backlight assembly 700, e.g., above the backlight assembly 700. The display panel assembly 800 includes a liquid crystal display panel 810, a printed circuit board 820, data tape carrier packages 830 (hereinafter, referred to as TCPs), gate TCPs 840, a mold frame 850, and a top chassis 860.

The liquid crystal display panel 810 includes two substrates and a liquid crystal layer interposed between the two substrates. The liquid crystal display panel 810 displays images by using a light provided from the backlight assembly 700 and in response to an image signal.

The printed circuit board 820 is electrically connected with the liquid crystal display panel 810 through the data TCPs 830, receives the image signal and outputs a data driving signal and a gate driving signal. The data TCPs 830 are attached to the printed circuit board 820 and the liquid crystal display panel 810, and receive the data driving signal and the gate driving signal from the printed circuit board 820. The data TCPs 8300 output a data signal to the liquid crystal display panel 810 in response to the data driving signal, and provide the gate driving signal to the gate TCPs 840 through the liquid crystal display panel 810. The gate TCPs 840 are attached to the liquid crystal display panel 810, receive the gate driving signal, and output a gate signal to the liquid crystal display panel 810 in response to the gate driving signal.

The liquid crystal display panel 810 is disposed in the mold frame 850. The mold frame 850 is substantially frame-shaped and includes a bottom surface including an opening such that the light exiting from the backlight assembly 700 is provided to the liquid crystal display panel 810.

The top chassis 860 covers an edge portion, (e.g., of an upper face) of the liquid crystal display panel 810 and guides a location of the liquid crystal display panel 810. The top chassis 800 is coupled to the bottom chassis 400 of the backlight assembly 700 and fixes the liquid crystal display panel 810 to the mold frame 850.

As in the illustrated embodiments including a backlight assembly, the reflecting plate includes a connecting line portion electrically connecting the first and second circuit boards of first and second light source units, respectively. Each of the first and second light source units does not need to have additional connectors in order electrically to connect the first and second circuit boards, and also do not need to have additional reflecting plates covering the connector and covering the first and second circuit boards. The reflecting plate serves a dual purpose of connecting multiple circuit boards and providing a reflecting member to the backlight assembly without adding components, such as having separate components for the same purposes. Advantageously, an assemblability and a brightness uniformity of the backlight assembly is improved, thereby enhancing the productivity and the display characteristics of the backlight assembly.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A reflector member of a backlight assembly, the reflector member comprising:
a base sheet including a first face reflecting a light;
a connecting line directly disposed on a second face of the base sheet opposite to the first face, and transmitting signals between a first electrical component and a second electrical component which is adjacent to the first electrical component, the first electrical component, the second electrical component and the reflector member being separate members from each other;
an input pad disposed at a first end portion of the connecting line and receiving the signals from the first electrical component; and
an output pad disposed at a second end portion of the connecting line and outputting the signals transmitted through the connecting line to the second electrical component.

2. The reflector member of claim 1, wherein the base sheet comprises one of polyethylene terephthalate, polycarbonate and a combination including at least one of the foregoing.

3. The reflector member of claim 1, further comprising:
a first pad electrode disposed on an upper surface of the input pad and electrically connected to the input pad, the first pad electrode outputting the signals provided from an exterior of the connecting line; and
a second pad electrode disposed on an upper surface of the output pad and electrically connected to the output pad, the second pad electrode outputting the signals provided from the output pad.

4. The reflector member of claim 3, wherein the first pad electrode and the second pad electrode comprise one of copper, silver and a combination including at least one of the foregoing.

5. The reflector member of claim 1, further comprising an insulating layer disposed on an upper surface of the connecting line and protecting the connecting line.

6. The reflector member of claim 1, further comprising openings extending through the base sheet, the openings disposed in an area corresponding to a light source of the backlight assembly, wherein the light source of the backlight assembly is inserted into the openings of the reflector member.

7. A backlight assembly comprising:
a light emitting unit including:
a plurality of light sources, each of the light sources emitting a light,
a first circuit board and a second circuit board providing a power to the light sources, the light sources disposed on upper faces of the first circuit board and the second circuit board;
a power output pad disposed on the upper face of the first circuit board and outputting the power, and
a power input pad disposed on the upper face of the second circuit board and receiving the power; and
a reflector member including:
a base sheet disposed above the first and the second circuit boards and reflecting the light, an upper face of the base sheet being disposed lower than an upper face of the light sources; and a connecting line directly disposed on a lower surface of the base sheet, the connecting line transmitting the power between the first and second circuit boards while being contacted with the first and second circuit boards, and being electrically connected between the power output pad and the power input pad of the light emitting unit.

8. The backlight assembly of claim 7, wherein the reflector member further comprises:
an input pad disposed at a first end portion of the connecting line, electrically connected with the power output pad of the light emitting unit, and receiving the power from the first circuit board of the light emitting unit; and
an output pad disposed at a second end portion of the connecting line, electrically connected with the power input pad of the light emitting unit, and providing the power received through the input pad to the second circuit board.

9. The backlight assembly of claim 8, wherein the reflector member further comprises:
a first pad electrode interposed between the input pad of the reflector member and the power output pad of the light emitting unit, and electrically connecting the input pad and the power output pad; and
a second pad electrode interposed between the output pad of the reflector member and the power input pad of the light emitting unit, and electrically connecting the output pad and the power input pad.

10. The backlight assembly of claim 9, further comprising an adhesive member interposed between the reflector member and the first circuit board, and between the reflector member and the second circuit board, the adhesive member attaching the reflector member to the first and the second circuit boards.

11. The backlight assembly of claim 10, wherein the adhesive member is interposed between the base sheet and the first circuit board, and between the base sheet and the second circuit board.

12. The backlight assembly of claim 10, wherein the adhesive member comprises a conductive adhesive material, and is interposed between the first pad electrode of the reflector member and the power output pad of the light emitting unit, and between the second pad electrode of the reflector member and the power input pad of the light emitting unit.

13. The backlight assembly of claim 7, wherein the reflector member further comprises an insulating layer disposed on an upper surface of the connecting line and protecting the connecting line.

14. The backlight assembly of claim 7, further comprising an inverter electrically connected with the first circuit board of the light emitting unit and providing the power to the light sources.

15. The backlight assembly of claim 7, wherein the light sources comprise a light emitting diode.

16. The backlight assembly of claim 7, wherein the reflector member further includes a plurality of openings corresponding to the plurality of light sources, and each of the plurality of light sources is inserted through one of the plurality of openings and in a direction towards the upper face of the base sheet.

17. A display apparatus comprising:
a display panel displaying images by using a light;
a light emitting unit including:
a plurality of light sources each emitting a light,
a first circuit board and a second circuit board, the first circuit board and the second circuit board providing a power to the plurality of the light sources,
wherein the plurality of light sources are disposed on an upper surface of the first circuit board and an upper surface of the second circuit board, a power output pad is disposed on the upper surface of the first circuit board and outputting the power, and a power input pad is disposed on the upper surface of the second circuit board and receiving the power; and
a reflector member including:
a base sheet reflecting the light; and
a connecting line transmitting the power between the first and second circuit boards,
wherein the base sheet is disposed above the first and the second circuit boards,
an upper surface of the base sheet is disposed lower than upper faces of the light sources, and
the connecting line is directly disposed on the base sheet, between the base sheet and the first circuit board, and between the base sheet and the second circuit board, to electrically connect the power output pad and the power input pad to each other.

18. The display apparatus of claim 17, wherein the light emitting unit further includes a plurality of first circuit boards and a plurality of second circuit boards, wherein the reflector member further includes a plurality of connecting lines,
wherein each of the connecting lines electrically connects a pair of circuit boards, the pair of circuit boards including a first circuit board and a second circuit board.

* * * * *